United States Patent [19]

Uffner et al.

[11] Patent Number: 4,569,968

[45] Date of Patent: Feb. 11, 1986

[54] JOINT SEALING COMPOUND

[75] Inventors: William E. Uffner, Newark; Bhalchandra B. Patil, Reynoldsburg, both of Ohio

[73] Assignee: Owens-Corning Fiberglas Corporation, Toledo, Ohio

[21] Appl. No.: 685,961

[22] Filed: Dec. 24, 1984

Related U.S. Application Data

[63] Continuation-in-part of Ser. No. 612,273, May 21, 1984, abandoned.

[51] Int. Cl.$^4$ .................. C08F 289/00; C08G 83/00
[52] U.S. Cl. .................................... 525/54.5; 524/71; 524/705
[58] Field of Search .................. 106/279, 13; 524/71, 524/705, 68; 525/54.5, 85

[56] References Cited

U.S. PATENT DOCUMENTS

| | | | |
|---|---|---|---|
| 3,179,610 | 4/1965 | Wood | 524/705 |
| 3,637,558 | 1/1972 | Verdol | 524/705 |
| 3,650,791 | 3/1972 | Fauber | 106/279 |
| 4,130,516 | 12/1978 | Gagle | 106/279 |
| 4,347,171 | 8/1982 | Uffner et al. | 524/71 |
| 4,403,067 | 9/1983 | Uffner et al. | 524/71 |
| 4,426,419 | 1/1984 | Uffner et al. | 428/290 |
| 4,444,947 | 4/1984 | Harrington et al. | 525/54.5 |
| 4,485,145 | 11/1984 | Harrington et al. | 428/489 |

Primary Examiner—Theodore Morris
Attorney, Agent, or Firm—Ronald C. Hudgens; Ted C. Gillespie

[57] ABSTRACT

A joint sealing compound comprises the reaction product of a non-blown asphalt flux, a hydroxyl-terminated polymer of butadiene, a vinyl monomer, a butadiene-styrene linear block polymer and an extender oil.

7 Claims, No Drawings

JOINT SEALING COMPOUND

This application is a continuation-in-part of Ser. No. 612,273 filed May 21, 1984, now abandoned.

TECHNICAL FIELD

This invention pertains to soft joint sealers.

In one of its more specific aspects, this invention pertains to joint sealers possessing sufficient flexibility to make them acceptable for sealing cracks in highways.

BACKGROUND OF THE INVENTION

The use of joint sealers in highway pavements is well known. Because of the severe use to which such sealers are put due to highway traffic, hot summer temperatures and frigid winter conditions, such joint sealers must possess a number of properties. Among these are suitable plasticity, resiliance, ductility, fluidity to facilitate application, and the like.

The joint sealer of this invention satisfies these requirements.

STATEMENT OF THE INVENTION

According to this invention, there is provided a composition consisting of a non-blown asphalt, a hydroxyl terminated polymer of butadiene, a vinyl monomer, a butadiene-styrene linear block polymer and an extender oil.

BRIEF DESCRIPTION OF THE INVENTION

Any suitable non-blown asphalt flux can be employed. In the preferred embodiment of the invention, the non-blown asphalt flux will be that petroleum residue remaining after fractionation of the crude. Preferably, the flux will have a viscosity within the range of from about 720 to about 760 cp at 200° F., and from about 125 to about 140 cp, at 260° F., a softening point within the range of from about 100° to about 110° F. and a penetration at room temperature within the range of from about 285 to 310 mm/10.

The asphalt will be contained in the composition in an amount within the range of from about 40 to about 60 weight percent, preferably within the range of from about 47 to about 57 weight percent, and most preferably in an amount of about 52 weight percent.

Any suitable hydroxyl-terminated polymer of butadiene can be employed. Preferably, the polymer will comprise a mixture having a number average molecular weight of about 3,000. The degree of polymerization of the mixture will be about 50, with the predominant configuration being Trans-1,4 (60%) with approximately 20% each of Cis-1,4 and Vinyl-1,2. The terminal hydroxyl groups will be primary and predominantly of the allylic type. The hydroxy functionality will be in the range of from about 2.4 to about 2.6. This material will be employed in an amount within the range of from about 3 to about 10 weight percent, preferably within the range of from about 4 to about 8 weight percent, and most and preferably in an amount of about 6 weight percent.

One particularly suitable mixture of hydroxyl-terminated polymers of butadiene is R-45HT available from Arco Chemical Co.

Any suitable vinyl monomer can be employed. Preferably, however, the vinyl monomer will be styrene which will be employed in an amount within the range of from about 5 to about 12 weight percent, preferably in an amount within the range of about 7 to about 9 weight percent, and, most preferably, in an amount of about 8 weight percent.

Any suitable butadiene-styrene linear block polymer can be employed. Preferably, the block polymer will have a butadiene to styrene ratio of about 75 to 25, a block polystyrene percentage of about 18, a molecular weight of about 83,000 and a specific gravity of about 0.93. This material will be employed in an amount within the range of from about 12 to about 25 weight percent, preferably within the range of from about 15 to about 19 weight percent and, most preferably, in an amount of about 17 weight percent.

One particularly suitable butadiene-styrene linear block polymer is Solprene 1205 avialable from Phillips Petroleum Co., Bartlesville, Okla.

Any suitable extender oil can be employed. Preferably, the extender oil will have a carbon atom analysis in weight percent of about 5 percent aromatic carbon atoms, about 27 percent naphthenic carbon atoms and about 68 percent paraffinic carbon atoms, the molecular weight of the oil being about 730. Such a material will correspond to ASTM rubber extending oil type 104B and will have a molecular analysis, in weight percent, of about 3.3 percent polar compounds, 28.0 percent aromatics and 68.7 percent saturates with no asphaltines.

This material will be employed in an amount within the range of from about 12 to about 25 weight percent, preferably within the range of from about 15 to about 19 weight percent, and most preferably, in an amount of about 17 weight percent.

One particularly suitable extender oil is Shellflex number 1790 available from Shell Oil Co.

The product of this invention is produced by adding the hydroxyl-terminated polymer of butadiene to the molten asphalt at about 110° C. The butadiene polymer is blended in and, while maintaining the temperature at 110° C., the extender oil is blended in. Next, the butadiene-styrene polymer is added as a crumb and blended into the composition at about 110° C. for about 20 minutes or until all solids are liquified. Finally, the styrene is added and the temperature is increased to about 185° C. at which temperature the composition is maintained for about 24 hours to produce, upon cooling, a soft plastic material at room temperature.

This joint sealer will have a cone penetration within the range of about 110 to about 150 mm/10 a resiliance, minimum, of about 60%, and a ductility, minimum, of about 34 cm.

It will be evident from the foregoing that various modifications can be made to this invention. Such, however, are considered to be within the scope of the invention.

We claim:

1. A reaction product of a mixture consisting of:
   (a) a non-blown asphalt flux in an amount within the range of from about 40 to about 60 weight percent;
   (b) a hydroxyl-terminated polymer of butadiene in an amount within the range of from about 3 to about 10 weight percent;
   (c) a vinyl monomer in an amount within the range of from about 5 to about 12 weight percent;
   (d) a butadiene-styrene linear block polymer in an amount within the range of from about 12 to about 25 weight percent; and,
   (e) an extender oil in an amount within the range of from about 12 to about 25 weight percent.

2. The composition of claim 1 in which said hydroxyl-terminated polymer of butadiene has a number average molecular weight of about 3,000 and a degree of polymerization of about 50.

3. The composition of claim 1 in which said vinyl monomer is styrene and said block polymer has a butadiene to styrene ratio of about 75 to 25.

4. The composition of claim 1 in which said extender oil has a molecular weight of about 720, and a molecular analysis of about 3.3 weight percent polar compounds, 28 weight percent aromatics and 68.7 percent saturates.

5. The composition of claim 1 consisting of about 47 to about 57 weight percent of said flux, of about 4 to about 8 weight percent of said polymer of butadiene, of about 7 to about 9 weight percent styrene, of about 15 to about 19 weight percent of said block polymer and of about 15 to about 19 weight percent of said extender oil.

6. The reaction product of claim 1 having a cone penetration of 110 to 150 mm/10 at 77° F., a minimum resiliance of 60% and a minimum ductility of about 34 cm.

7. A joint sealer compound comprising the reacted product of the mixture defined in claim 1, said mixture being reacted at about 185° C. for a period of about 24 hours.

* * * * *